United States Patent
Cutler et al.

(10) Patent No.: US 8,776,673 B2
(45) Date of Patent: Jul. 15, 2014

(54) BOILERLESS STEAMING OVEN AND METHOD

(75) Inventors: Richard I. Cutler, Chardon, OH (US); Owen R. McGhee, Jr., Willoughby, OH (US); David S. Schwerzler, Chagrin Falls, OH (US); Victor D. Saltenis, Kirtland, OH (US)

(73) Assignee: Cleveland Range, Cleveland, OH (US)

( * ) Notice: Subject to any disclaimer, the term of this patent is extended or adjusted under 35 U.S.C. 154(b) by 768 days.

(21) Appl. No.: 11/705,940

(22) Filed: Feb. 14, 2007

(65) Prior Publication Data

US 2007/0199932 A1    Aug. 30, 2007

Related U.S. Application Data

(60) Provisional application No. 60/773,632, filed on Feb. 15, 2006.

(51) Int. Cl.
*A47J 37/07* (2006.01)
*A21B 3/04* (2006.01)

(52) U.S. Cl.
CPC ........................................ *A21B 3/04* (2013.01)
USPC ............................................ 99/340; 219/401

(58) Field of Classification Search
CPC .......... A47J 27/16; A21B 3/04; A23L 1/0121
USPC ................ 99/340, 339; 126/35, 139.1, 139.2, 126/139.3, 369, 369.1, 369.2, 369.3; 219/401

See application file for complete search history.

(56) References Cited

U.S. PATENT DOCUMENTS

| | | | | | |
|---|---|---|---|---|---|
| 3,604,895 | A | * | 9/1971 | MacKay | 219/401 |
| 4,451,733 | A | * | 5/1984 | Avery et al. | 250/342 |
| 4,541,733 | A | * | 9/1985 | Andre | 374/149 |
| 4,637,303 | A | * | 1/1987 | Lucky | 99/426 |
| 5,235,903 | A | | 8/1993 | Tippmann | 99/331 |
| 5,415,082 | A | * | 5/1995 | Nagao | 99/403 |
| 5,865,101 | A | * | 2/1999 | Brown | 99/340 |
| 6,070,571 | A | * | 6/2000 | Bradbury | 126/30 |
| 6,199,474 | B1 | * | 3/2001 | Lee | 99/450 |
| 6,833,534 | B2 | * | 12/2004 | Bellassai et al. | 219/401 |
| 2001/0045422 | A1 | * | 11/2001 | Gouthiere | 219/432 |
| 2003/0213792 | A1 | * | 11/2003 | Bellassai et al. | 219/401 |

* cited by examiner

*Primary Examiner* — John Wasaff
(74) *Attorney, Agent, or Firm* — Ohlandt, Greeley, Ruggiero & Perle, L.L.P.

(57) ABSTRACT

A steaming oven having a clad plate bottom. The stainless steel clad material constitutes the bottom of the boiling water reservoir in the oven chamber. The stainless steel clad material is composed of a thin layer of stainless material clad to a thicker plate of base, heat conducting metal like steel, copper or aluminum.

18 Claims, 3 Drawing Sheets

BOILERLESS STEAMING OVEN AND METHOD

RELATED APPLICATION

This application claims the benefit of U.S. Provisional Patent Application Ser. No. 60/773,632, filed on Feb. 15, 2006, the entire contents of which are incorporated herein by reference.

FIELD OF THE INVENTION

This invention relates to a method and a steaming oven having a clad material bottom incorporated into the steam generating area that resists warping and retains heat.

BACKGROUND OF THE INVENTION

Sub-atmospheric cook-and-hold steaming ovens are known. For example, U.S. Pat. No. 5,235,903 discloses an open topped water holding tray that is disposed at the bottom of the oven. The oven includes means to heat the water to provide steam for cooking and/or holding food products warm and moist. A manually operated drain valve is provided near the lowermost portion of the water tray. An optional grease catching pan is disposed between the racks of the oven and the water tray. The drain valve is manually operated to periodically drain the water tray.

Use of clad material in cooking appliances, specifically skillets and braising pans, is known. For example, U.S. Pat. No. 5,865,101 discloses a braising pan that could incorporate clad material for a bottom.

There is a need for an improved steaming oven with a bottom that resists deformation, such as warping.

SUMMARY OF THE INVENTION

A steaming oven of the present invention comprises a housing that supports a cooking chamber. A water reservoir is disposed in a bottom region of the oven chamber. The water reservoir comprises a bottom plate of a heavy construction so as to prevent deformation. A heater is disposed below the water reservoir to heat the bottom plate and the water to a temperature to provide steam in the cooking chamber.

In one embodiment of the steaming oven of the present invention, the water reservoir further comprises one or more walls of the cooking chamber.

In another embodiment of the steaming oven of the present invention, each of the side walls has a thickness that is in a range of about 7% to about 12% of a thickness of the bottom plate.

In another embodiment of the steaming oven of the present invention, a weight of each of the side walls is in a range of about 8% to about 13% of a weight of the bottom plate.

In another embodiment of the steaming oven of the present invention, the bottom plate comprises a layer of base metal that is bonded to a thinner top layer of metal.

In another embodiment of the steaming oven of the present invention, the base metal is selected from the group consisting of: copper, aluminum, steel or an alloy thereof.

In another embodiment of the steaming oven of the present invention, the top layer is preferably stainless steel.

In another embodiment of the steaming oven of the present invention, a water valve admits water into the water reservoir and a drain drains water from the water reservoir.

In another embodiment of the steaming oven of the present invention, a collector plate is disposed above the water reservoir to collect waste droppings from the cooking of food in the oven chamber.

In another embodiment of the steaming oven of the present invention, the collector plate is disposed to provide a passage for the steam to fill the oven chamber.

In another embodiment of the steaming oven of the present invention, an underside of the bottom plate comprises angle or tee bar stock, thereby transferring additional heat to the bottom plate.

A method of the present invention provides steam in a cooking chamber by performing the steps of:

heating water in a water reservoir to provide steam in the oven chamber; and providing the water reservoir with one or more sides and a bottom plate that is thicker than the sides so as to resist deformation and retain heat.

In one embodiment of the method of the present invention, each of the sides of the water reservoir has a thickness that is in a range of about 7% to about 12% of a thickness of the bottom plate thereof.

In another embodiment of the method of the present invention, a weight of each of the sides is in a range of about 8% to about 13% of a weight of the bottom plate.

In another embodiment of the method of the present invention, the bottom plate comprises a layer of base metal that is bonded to a thinner top layer of metal.

In another embodiment of the method of the present invention, the base metal is selected from the group consisting of: copper, aluminum, steel or an alloy thereof.

In another embodiment of the method of the present invention, the top layer is preferably stainless steel.

In another embodiment of the method of the present invention, an underside of the bottom plate comprises angle or tee bar stock, thereby transferring additional heat to the bottom plate.

BRIEF DESCRIPTION OF THE DRAWINGS

Other and further objects, advantages and features of the present invention will be understood by reference to the following specification in conjunction with the accompanying drawings, in which like reference characters denote like elements of structure and.

DESCRIPTION OF THE PREFERRED EMBODIMENT

As used herein, steaming oven is intended to include any cooking oven that uses steam in whole or in part to cook. For example, the oven may use steam only or steam in combination with convection, conduction or other thermal transfer. Thus, the steaming oven of the present invention includes, for example, steam ovens as well as convection ovens, microwave ovens or combinations thereof that also employ steam.

A steaming oven of the present invention comprises an oven chamber and a water reservoir disposed in the oven chamber to provide steam therein. An overflow tube is disposed in the water reservoir so as to prevent water from exceeding a predetermined level. A collector plate is disposed in the oven chamber above the water reservoir.

The water reservoir is composed of 5 sides all made of or coated with stainless steel. The bottom is fabricated from a clad material which has a thin layer of stainless steel bonded to a thicker base plate.

The bottom plate is welded to the inner walls of the cooking chamber to form a liquid tight seal between it and those walls. The underside of the bottom plate may include angle or tee bar stock, transferring additional heat to the bottom plate. The bottom plate can be formed from another metal that is clad with stainless steel. For example, the base metal can be any heat conductive metal, such as aluminum, copper or steel.

Figure 1:
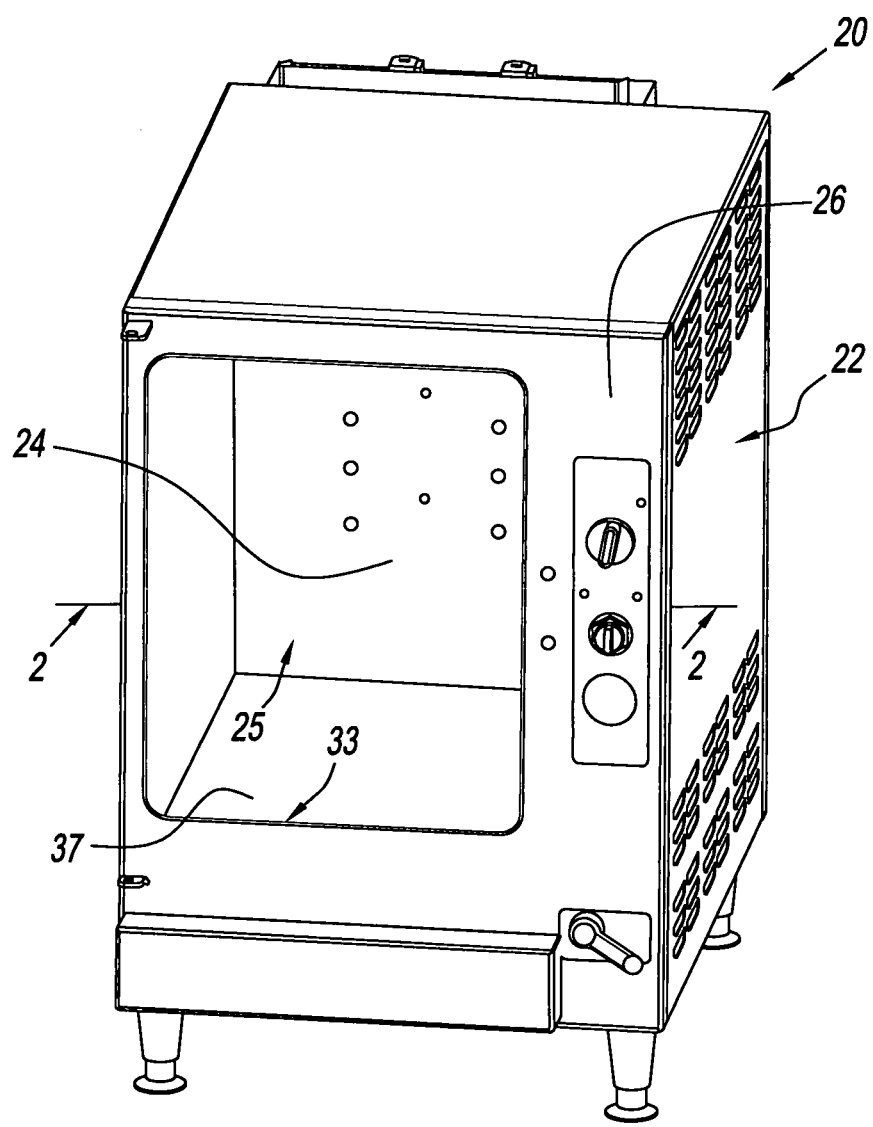
FIG. 1 is a perspective view of the steaming oven of the present invention with oven door removed.
Figure 2:
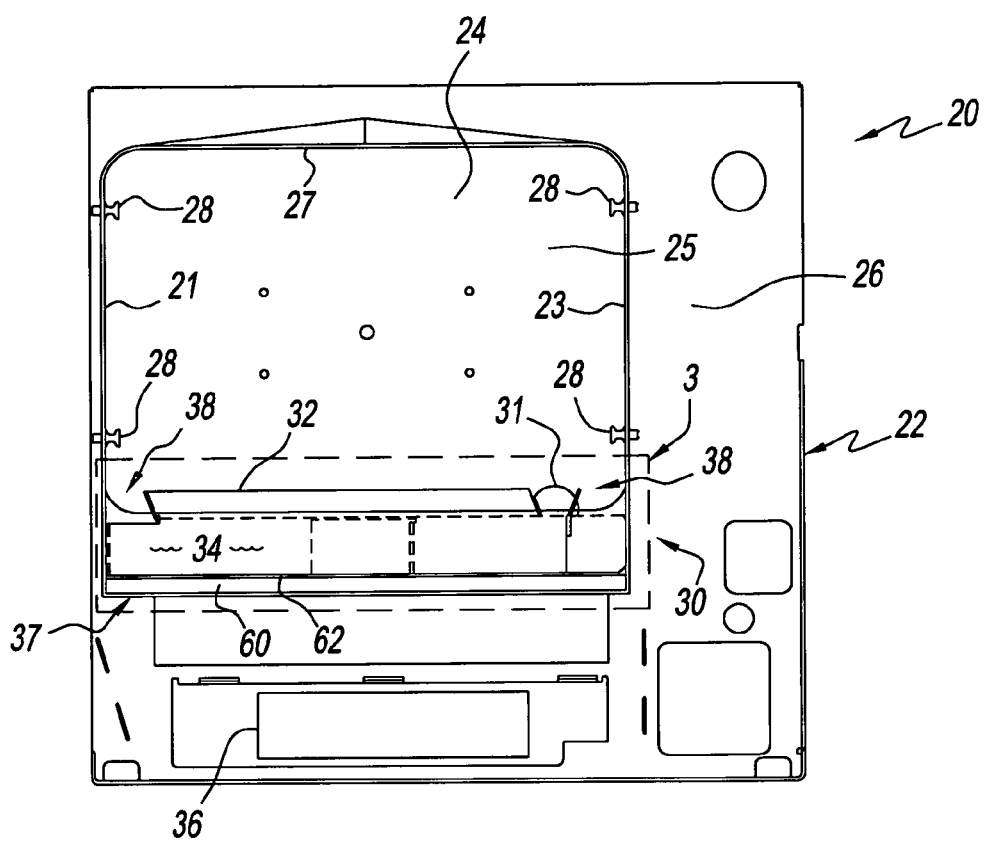
FIG. 2 is a view along line 2 of FIG. 1.
Figure 3:
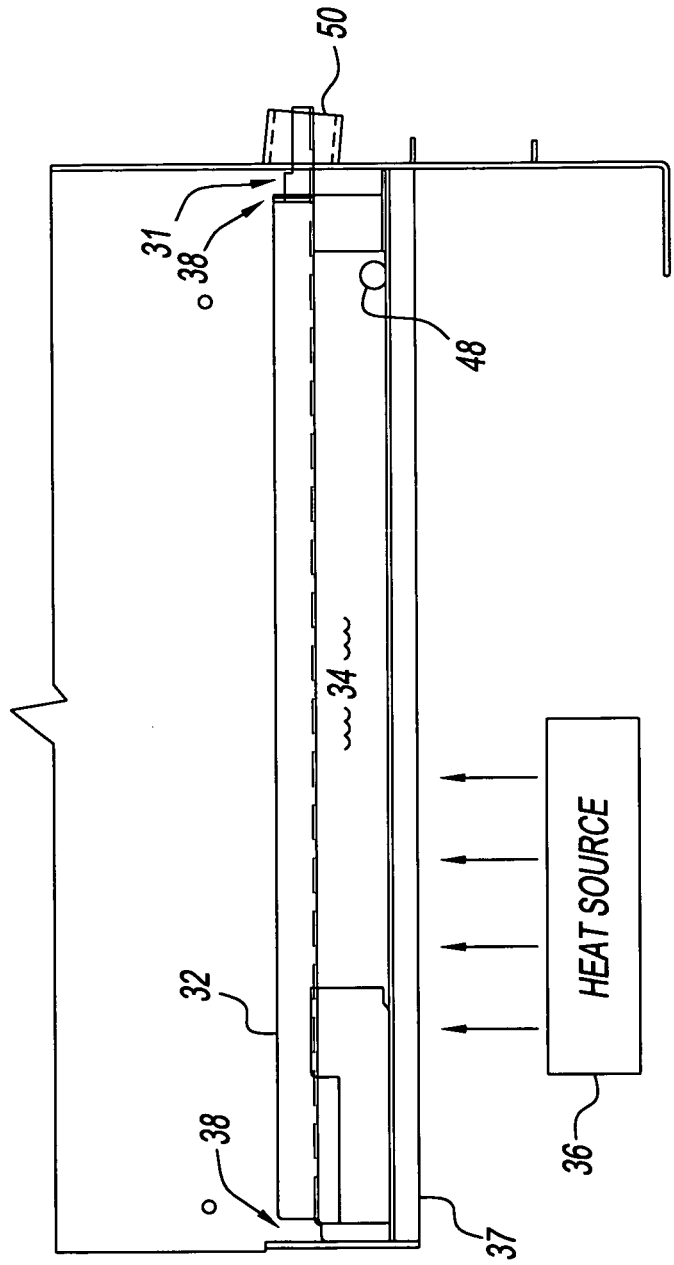
FIG. 3 is an enlarged view of detail 3 of FIG. 2.

Referring to FIGS. 1-3, a steaming oven 20 of the present invention includes a housing 22 that supports a cooking chamber 24 and a region 26 for such items as controls, a blower fan, and/or a microwave energy source (none of which is shown). Oven chamber 24 is formed by a pair of side walls 21 and 23, a back wall 25, a top wall 27, a front wall 33, a bottom wall or plate 37 and a door (not shown). Front wall 33 has an opening that is covered by the door when closed and that extends at least vertically below the opening. Oven chamber 24 includes rack holders 28, a reservoir 30 and a collector plate 32. Rack holders 28 are disposed on side walls 21 and 23 to hold racks (not shown) upon which food may be located for cooking. It will be apparent to those skilled in the art that rack holders 28 may include additional holders to hold more than one rack.

Reservoir 30 is formed by bottom plate 37, side walls 21 and 23, back wall 25 and a portion of front wall 33 that extends below the door opening to hold water 34. Bottom plate 37 is preferably welded or otherwise fastened to side walls 21 and 23, back wall 25 and front wall 33 to form a water tight seal. The underside of bottom plate 37 may include angle or tee bar stock, transferring additional heat to bottom plate 37. An overfill tube 31 is disposed in reservoir 30 to prevent water 34 from exceeding a predetermined level therein.

Bottom plate 37 is a clad bottom that comprises a thick base metal 60, which is bonded or clad to a thinner layer of metal 62. Base metal 60 can be any suitable heat conductive metal that has enough strength so as not to warp or deform in use. For example, base metal 60 is preferably copper, aluminum, steel or an alloy thereof. Metal 62 is a thin layer of stainless steel or other suitable metal. Side walls 21 and 23, back wall 25 and front wall 33 are also preferably coated with stainless steel at least in the portions thereof that form water reservoir 30.

It will be apparent to those skilled in the art that reservoir 30 may be a separate tray or other vessel. For example, water reservoir 30 can be a reservoir that is formed of one or more sides coated with stainless steel and bottom plate 37 and that is placed in a lower region of oven chamber 24.

Reservoir 30 comprises a water fill valve (not shown) and a drain 48. The water fill valve may be manually operated or automatically operated in response to a water level sensor (not shown) that senses water level in reservoir 30. Drain 48 may be interconnected with tubing and a drain valve (neither being shown) to drain water 34 from reservoir 30. Overfill tube 31 is connected via an oven exit hole 50 to drain water 34 and waste material to an external drain or vessel.

A heater 36 is disposed in region 26 in a location to heat reservoir 30 so as to boil water 34, thereby producing steam. For example, heater 36 may be disposed below reservoir 30. Heater 36 may be an electrical heater, a gas burner or other heater suitable for heating reservoir 30 to boil water 34.

Collector plate 32 is disposed in oven chamber 24 above reservoir 30 so as to prevent waste material from falling into reservoir 30 and contaminating water 34. Thus, collector plate 32 is large enough to catch waste material produced by cooking and small enough to allow steam from reservoir 30 to rise in oven chamber 24 for cooking. To this end, collector plate 32 is shorter in width and length than reservoir 30 to form a passage 38 as a border between collector plate 32 and the perimeter of reservoir 30 to allow steam to rise and fill oven chamber 24. Passage 38 is formed between collector plate 32 and side walls 21 and 23 and back wall 25 of oven chamber 24, but could just as well also be formed along front wall 33 thereof. It will be apparent to those skilled in the art that passage 38 can be along more or less than three sides of collector plate 32 or could even be formed by perforations in a border of collector plate 32.

The waste material, for example, includes solid and liquid droppings from the food being cooked as well as condensed steam droplets. The droppings may be directly from the food or from solid or perforated pans holding the food.

Preferably, the highest point of collector plate 32 is at the front of oven chamber 24 and below the door opening. This assures that oven chamber 24 cannot be flooded (and injure a person opening the door) in the case of a malfunctioning water fill valve (not shown).

Steaming oven 20 of the present invention provides several advantages. The heavy plate bottom 37 resists warping or other deformation during abnormal situations, such as low water or dry fire conditions. The mass of the bottom retains heat longer, so that during normal operation when the oven is opened and interior steam/heat released, operating temperature is reached in a shorter time period. The thin layer of stainless steel meets national sanitation requirements, while also being easy to clean, corrosion resistant and durable. Excess heat from the heat source is absorbed by the mass of the bottom clad plate 37. In contrast, side walls 21 and 23, back wall 25 and front wall 33 are preferably sheet metal that is considerably thinner than bottom clad plate 37. Thus, the heavier and thicker bottom clad plate 37 limits the impact on the thinner sheet metal sides and minimizing undesired deformation. Preferably, side walls 21 and 23, back wall 25 and front wall 33 have a thickness that is in a range of about 7% to about 12% of a thickness of bottom plate 37. Preferably, side walls 21 and 23, back wall 25 and front wall 33 have a weight that is in a range of about 8% to about 13% of a weight of bottom plate 37.

The clad bottom plate 37 may be constructed to increase the surface area and enhances the initial thermal transfer from the heat source 36 to the bottom plate 37. For example, bottom plate 37 may include angle or tee shaped steel (not shown) to the bottom by seam welding, or any other method of fastening.

The present invention having been thus described with particular reference to the preferred forms thereof, it will be obvious that various changes and modifications may be made therein without departing from the spirit and scope of the present invention as defined in the appended claims.

What is claimed is:

1. A steaming oven comprising:
   a housing comprising a top wall, a bottom wall, a back wall, a front wall and two side walls that form a cooking chamber;
   a door disposed in said front wall;
   a water reservoir that is disposed in a bottom region of said cooking chamber and that comprises one or more reservoir side walls and a bottom plate of a heavy construction that is thicker than said reservoir side walls and that comprises a thin metallic top layer bonded to a thick layer of base metal so as to prevent deformation, wherein each of said one or more reservoir side walls has a thickness that is in a range of about 7% to about 12% of a thickness of said bottom plate; and a heater disposed below said water reservoir to heat said bottom plate and said water to a temperature to provide steam in said cooking chamber.

2. The steaming oven of claim 1, wherein said front wall, said back wall and side walls comprise said one or more reservoir side walls and said bottom wall comprises said bottom plate.

3. The steaming oven of claim 1, a weight of each of said one or more reservoir side walls is in a range of about 8% to about 13% of a weight of said bottom plate.

4. The steaming oven of claim 1, wherein said base metal is selected from the group consisting of: copper, aluminum, steel or an alloy thereof.

5. The steaming oven of claim 4, wherein said top layer is stainless steel.

6. The steaming oven of claim 1, further comprising a water valve to admit water into said water reservoir and a drain to drain water from said water reservoir.

7. The steaming oven of claim 1, further comprising a collector plate disposed above said water reservoir to collect waste droppings from the cooking of food in said cooking chamber.

8. The steaming oven of claim 7, wherein said collector plate is disposed to provide a passage for said steam to fill said cooking chamber.

9. The steaming oven of claim 1, wherein an underside of said bottom plate comprises angle or tee bar stock, thereby transferring additional heat to the bottom plate.

10. The steaming oven of claim 1, wherein water in said water reservoir is in contact with a top of said bottom plate.

11. The steaming oven of claim 1, wherein said housing further comprises a region outside of said cooking chamber, and wherein said heater is disposed in said region outside said cooking chamber to provide heat from below to a bottom of said bottom plate.

12. A method for providing steam in a cooking chamber of a steaming oven, comprising:

heating water in a water reservoir to provide steam in said cooking chamber; and providing said water reservoir with one or more sides and a bottom plate that is thicker than said one or more sides so as to resist deformation and retain heat, wherein each of said one or more sides has a thickness that is in a range of about 7% to about 12% of a thickness of said bottom plate, and wherein said bottom plate comprises a thin metallic top layer bonded to a thicker layer of base metal so as to prevent deformation.

13. The method of claim 12, wherein a weight of each of said one or more sides is in a range of about 8% to about 13% of a weight of said bottom plate.

14. The method of claim 12, wherein said base metal is selected from the group consisting of: copper, aluminum, steel or an alloy thereof.

15. The method of claim 14, wherein said top layer is stainless steel.

16. The method of claim 12, wherein an underside of said bottom plate comprises angle or tee bar stock, thereby transferring additional heat to the bottom plate.

17. The method of claim 12, wherein water in said water reservoir is in contact with a top of said bottom plate.

18. The method of claim 12, wherein said heating step provides heat from below said bottom plate to heat the water.

* * * * *